United States Patent

Morita et al.

[11] Patent Number: 6,009,239
[45] Date of Patent: Dec. 28, 1999

[54] INFERENCE APPARATUS AND METHOD FOR PROCESSING INSTANCES USING LINEAR FUNCTIONS OF EACH CLASS

[75] Inventors: Chie Morita, Tokyo; Hiroshi Tsukimoto, Saitama-ken, both of Japan

[73] Assignee: Kabushiki Kaisha Toshiba, Kanagawa-ken, Japan

[21] Appl. No.: 08/495,927

[22] Filed: Jun. 28, 1995

[30] Foreign Application Priority Data

Jun. 29, 1994 [JP] Japan ........................ 6-147250

[51] Int. Cl.⁶ ........................................... G06F 15/18
[52] U.S. Cl. ............................................... 395/77
[58] Field of Search .................... 395/77, 50, 52, 395/61, 62, 10, 75; 382/226

[56] References Cited

U.S. PATENT DOCUMENTS

| | | | |
|---|---|---|---|
| 5,195,172 | 3/1993 | Elad et al. | 395/50 |
| 5,253,333 | 10/1993 | Abe | 395/62 |
| 5,293,585 | 3/1994 | Morita | 395/52 |
| 5,297,239 | 3/1994 | Kurosawa et al. | 395/75 |
| 5,422,980 | 6/1995 | Kurosawa et al. | 395/10 |
| 5,566,274 | 10/1996 | Ishida et al. | 395/61 |

FOREIGN PATENT DOCUMENTS 6-119309  4/1994  Japan .

OTHER PUBLICATIONS

Quinlan, Induction of Decision Trees, Machine Learning I, pp. 81–106 1986.

Junkar et al., Grinding process control through monitoring and machine learning, Third international conference on factory 2000, pp. 77–80, Jul. 29, 1992.

*Primary Examiner*—Robert W. Downs
*Assistant Examiner*—Sanjiv Shah
*Attorney, Agent, or Firm*—Finnegan, Henderson, Farabow, Garrett & Dunner, L.L.P.

[57] ABSTRACT

An inference apparatus predicts the class of a new instance whose class is unknown or generates a rule which is common to an instance set. In the inference apparatus, an instance memory section stores the instance set which each include attribute—value and class. The data type of the attribute—value is discrete type or continuous type. An instance expression section converts the attribute—value of discrete type to a first data expression and the attribute—value of continuous type to a second data expression. A parameter calculation section generates a linear function of each class in which the attribute—value is a variable and calculates a coefficient of each variable in the linear function by assigning one of the first data expression and the second data expression to the variables. A prediction section assigns the attribute—value of the new instance to the variable of the linear function of each class and predicts the class of the new instance by comparing function values among all linear functions of each class. A rule generation section determines coefficients of an orthogonal function by orthogonal expansion of each variable in the linear function, converts each coefficient of the orthogonal function to the first data expression and calculates a logical proposition as the rule from the orthogonal function including the coefficients of the first data expression.

17 Claims, 15 Drawing Sheets

| PERSON | ATTRIBUTE | | CLASS (HEALTH) |
|---|---|---|---|
| | STATURE | WEIGHT | |
| A | 180 | 65 | O |
| B | 160 | 80 | X |
| C | 175 | 62 | O |
| D | 165 | 50 | X |
| E | 170 | 60 | O |
| F | 172 | 61 | O |
| . | . | . | . |
(O: NORMAL
X: ABNORMAL)
FIG. 1
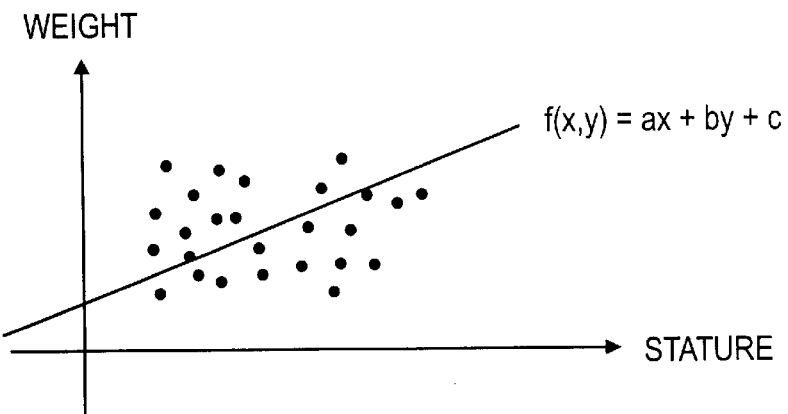
FIG. 2
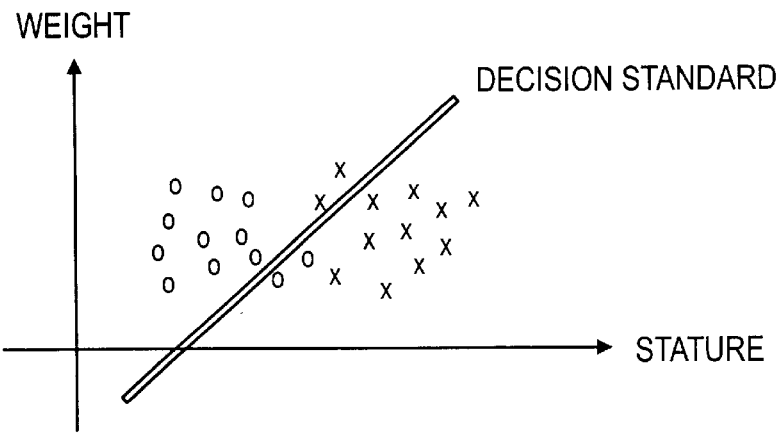
FIG. 3

| DAY | ATTRIBUTE | | | CLASS |
|---|---|---|---|---|
| | WEATHER | WIND | HUMIDITY | |
| 1 | FINE | STRONG | LOW | X |
| 2 | CLOUD | WEAK | LOW | O |
| 3 | RAIN | STRONG | HIGH | X |
| 4 | RAIN | WEAK | HIGH | X |
| 5 | FINE | WEAK | LOW | O |

| ATTRIBUTE | ATTRIBUTE-VALUE |
|---|---|
| MATERIAL 1 | NUMERICAL VALUE |
| MATERIAL 2 | NUMERICAL VALUE |
| PROCESS | { P, Q } |
| QUALITY | { EXCELLENT, GOOD } |

*FIG. 11*

| | ATTRIBUTE | | | CLASS (QUALITY) |
|---|---|---|---|---|
| | MATERIAL 1 | MATERIAL 2 | PROCESS | |
| $E_1$ | 5 | 10 | P | EXCELLENT |
| $E_2$ | 20 | ? | Q | GOOD |
| $E_3$ | 50 | 20 | P | EXCELLENT |
| $E_4$ | 30 | 40 | Q | GOOD |
| $E_5$ | 50 | 10 | Q | GOOD |
| $E_6$ | 10 | 20 | P | GOOD |

*FIG. 12*

|  | MATERIAL 1 | MATERIAL 2 | PROCESS P | PROCESS Q | QUALITY EXCELLENT |
|---|---|---|---|---|---|
| $E_1$ | 0.000 | 0.000 | 1 | 0 | 1 |
| $E_2$ | 0.333 | 0.667 | 0 | 1 | 0 |
| $E_3$ | 1.000 | 0.667 | 1 | 0 | 1 |
| $E_4$ | 0.555 | 1.000 | 0 | 1 | 0 |
| $E_5$ | 1.000 | 0.000 | 0 | 1 | 0 |
| $E_6$ | 0.333 | 0.333 | 1 | 0 | 0 |

*FIG. 14*

|  | MATERIAL 1 | MATERIAL 2 | PROCESS P | PROCESS Q | QUALITY GOOD |
|---|---|---|---|---|---|
| $E_1$ | 0.000 | 0.000 | 1 | 0 | 0 |
| $E_2$ | 0.333 | 0.667 | 0 | 1 | 1 |
| $E_3$ | 1.000 | 0.667 | 1 | 0 | 0 |
| $E_4$ | 0.555 | 1.000 | 0 | 1 | 1 |
| $E_5$ | 1.000 | 0.000 | 0 | 1 | 1 |
| $E_6$ | 0.111 | 0.333 | 1 | 0 | 1 |

*FIG. 15*

| MATERIAL 1 | MATERIAL 2 | PROCESS |
|---|---|---|
| 20 | 15 | ? |

⇩

| MATERIAL 1 | MATERIAL 2 | PROCESS P | PROCESS Q |
|---|---|---|---|
| 0.333 | 0.166 | 0 | 0 |

RULE GENERATION RESULT: (NOT) X2 V X2 X4

IF    " USE-QUANTITY OF MATERIAL 2 IS A LITTLE " OR " (USE-QUANTITY OF MATERIAL 2 IS MUCH) AND (PROCESS IS Q) "

THEN    QUALITY IS EXCELLENT

FIG. 20A

RULE GENERATION RESULT: X2 V(NOT) X2 X 4

IF    " USE-QUANTITY OF MATERIAL 2 IS MUCH " OR " (USE-QUANTITY OF MATERIAL 2 IS A LITTLE) AND (PROCESS IS Q) "

THEN    QUALITY IS GOOD

FIG. 20B

INFERENCE APPARATUS AND METHOD FOR PROCESSING INSTANCES USING LINEAR FUNCTIONS OF EACH CLASS

BACKGROUND OF THE INVENTION

1. Field of the Invention

The present invention relates to an inference apparatus and method for predicting a class of a new instance whose class is unknown, or for generating a rule which is common to an instance set.

2. Description of the Related Art

Recently, there is a practice in various technological areas of creating an inference system in order to output a solution for a user's question. For example, in medical terminology there is a practice to diagnose a patient's disease, by use of an "expert system" instead of a doctor. For example, a doctor inputs the condition of the patient to the expert system and the expert system predicts the name of the disease according to medical knowledge. In this case, the expert system previously stores rules based on the knowledge, such as if-then rules, and provides guidance to the solution by using the rules.

To form rules, the user previously inputs an instance set (plural instances) to the expert system and the expert system generates rules from the instance set. In short, it is important for the inference system to generate correct rules from the instance set and to correctly predict the answer to the question according to the rules.

As one method to predict the answer for a question by using the instance set, statistical multiple regression analysis is well known. In multiple regression analysis, a regression equation which represents the kind of instance set is determined and a value of the new instance (question) is assigned to a variable of the regression equation to predict the answer of the new instance. FIG. 1 shows one example of the instance set to generate a regression equation. In FIG. 1, one instance is comprised of attributes (person's stature, weight) and class (health condition). According to a relation between stature and weight, class "O" is marked if the person is in normal health condition and class "X" is marked if the person is in abnormal health condition. FIG. 2 shows a graph of weight vs stature on which is plotted cross points relating stature and weight, and the regression equation which represents the tendency of the group of cross points. If the value of stature and weight of a patient is assigned as a variable of the regression equation "f(X)+ax=by=c", it is decided whether the patient is in normal health condition or not. However, in the multiple regression analysis, it is difficult to generate rules from the regression equation. Furthermore, the attribute-value is comprised of a continuous value only, though a discrete value is also necessary for the attribute. Therefore, it is insufficient to acquire knowledge for the inference system.

As a method to classify the new instance, discriminant analysis is well known. FIG. 3 shows a graph on which normal points "O" and abnormal points "X" representing relations between stature and weight are plotted, as well as the decision standard which discriminates "O" and "X" on the graph. However, in the discriminant analysis, a specialist must determine the decision standard by observing the marked point on the graph. Therefore, the decision standard includes the specialist's subjectivity and it is sometimes incorrect.

On the other hand, in the field of machine learning, a decision tree is determined by the instance set and the answer for a new instance (question) is predicted according to the decision tree ("Induction of Decision Trees" Machine Learning 1, pp 81–106, 1986). FIG. 4 shows the instance set to determine the decision tree. In FIG. 4, one instance is comprised of attributes (weather, wind, humidity of every day) and class (for example, the day is suitable for fishing or not). FIG. 5 is the decision tree which represents the relation between the attributes and class shown in FIG. 4. In FIG. 5, if the weather is rain, the day (today) is not suitable for fishing. If the weather is fine and the wind is strong, the day is not suitable for fishing. If the weather is fine and the wind is weak, the day is suitable for fishing. If the weather is cloudy and the humidity is low, the day is suitable for fishing. If the weather is cloudy, the humidity is high and the wind is weak, the day is suitable for fishing. If the weather is cloudy, the humidity is high and the wind is strong, the day is not suitable for fishing.

If the number of attributes is large, the shape of the decision tree is more complicated. Therefore, it is difficult for a user to extract the relation between attributes from the decision tree. Furthermore, the attribute-value is comprised of discrete values only, though continuous values may also be necessary for attributes. In short, it is difficult for the inference system to generate correct rules as knowledge from the decision tree.

SUMMARY OF THE INVENTION

It is an object of the present invention to provide inference apparatus and method for generating rules from the instance set and for predicting an answer to a question (new instance) according to the rules.

It is another object of the present invention to provide inference apparatus and method for processing the instance set whose attribute-values are comprised of both discrete value and continuous value.

According to the present invention, there is provided Inference apparatus for predicting a class of a new instance, wherein the new instance includes an attribute-value, comprising;

instance memory means for storing an instance set each of which includes an attribute—value and a class, wherein a data type of the attribute—value is a discrete type or a continuous type;

instance expression means for converting the attribute—value of discrete type to a first data expression and the attribute value of continuous type to a second data expression;

parameter calculation means for generating a linear function of each class in which the attribute—value of the instance set is a variable, and for calculating a coefficient of each variable in the linear function by assigning one of the first data expression and the second data expression of the instance set to each of the variables; and prediction means for assigning the attribute—value of the new instance to the variable of the linear function of each class, and for predicting the class of the new instance by comparing function values among all linear functions of each class.

Further in accordance with the present invention, there is provided Inference apparatus for generating a rule which is common to an instance set, comprising;

instance memory means for storing the instance set each of which includes an attribute—value and a class, wherein a data type of the attribute—value is a discrete type or a continuous type;

instance expression means for converting the attribute—value of discrete type to a first data expression and the attribute—value of continuous type to a second data expression;

parameter calculation means for generating a linear function of each class in which the attribute—value is a variable, and for calculating a coefficient of each variable in the linear function by assigning one of the first data expression and the second data expression to each of the variables; and rule generation means for determining coefficients of an orthogonal function by orthogonal expansion of each variable in the linear function, for expressing each coefficient of the orthogonal function as the first data expression, and for calculating a logical proposition as the rule from the orthogonal function including each coefficient of the first data expression.

BRIEF DESCRIPTION OF THE DRAWINGS

FIG. 1 is one example of an instance set.

FIG. 2 is graph which represents the relation between stature and weight.

FIG. 3 is graph which represents normal points and abnormal points as a relation between stature and weight.

FIG. 11 is a schematic diagram of attributes and attribute-values.

FIG. 12 is a schematic diagram of the instance set consisting of attribute-value and class.

FIG. 14 is a schematic diagram of the instance set whose quality is excellent and attribute-values converted to first and second data expressions.

FIG. 15 is a schematic diagram of the instance set whose quality is good and attribute-values converted to first and second data expression.

FIG. 20A and FIG. 20B are schematic diagrams of display of an if-then rule.

DETAILED DESCRIPTION OF THE PREFERRED EMBODIMENTS

Figures 4, 5:
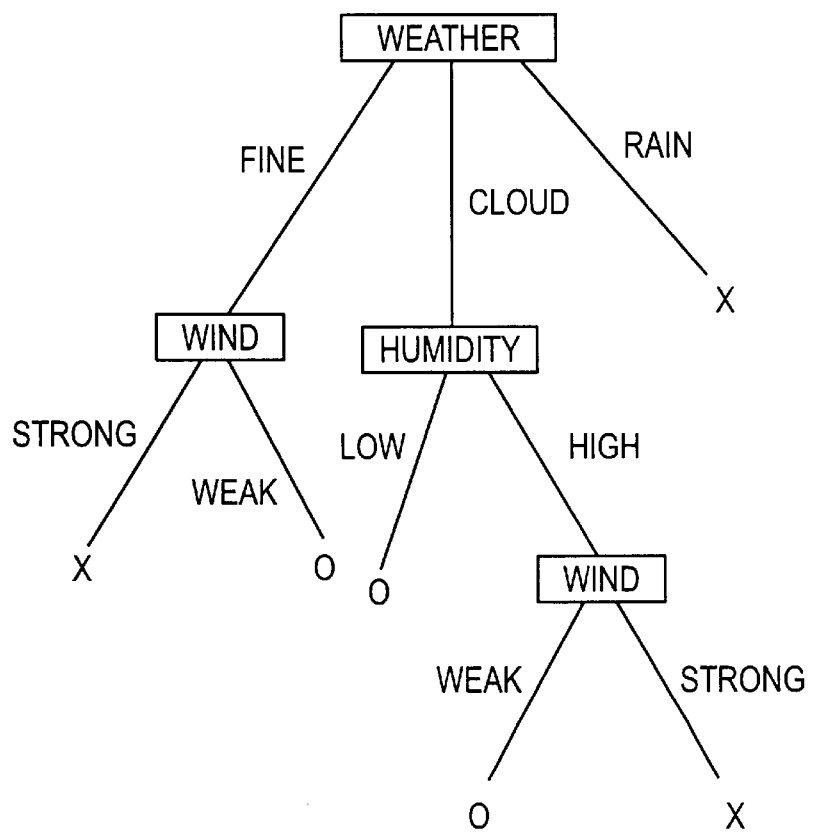
FIG. 4 is another example of the instance set.
FIG. 5 is a decision tree which represents the relation between attribute and class.
Figure 6:
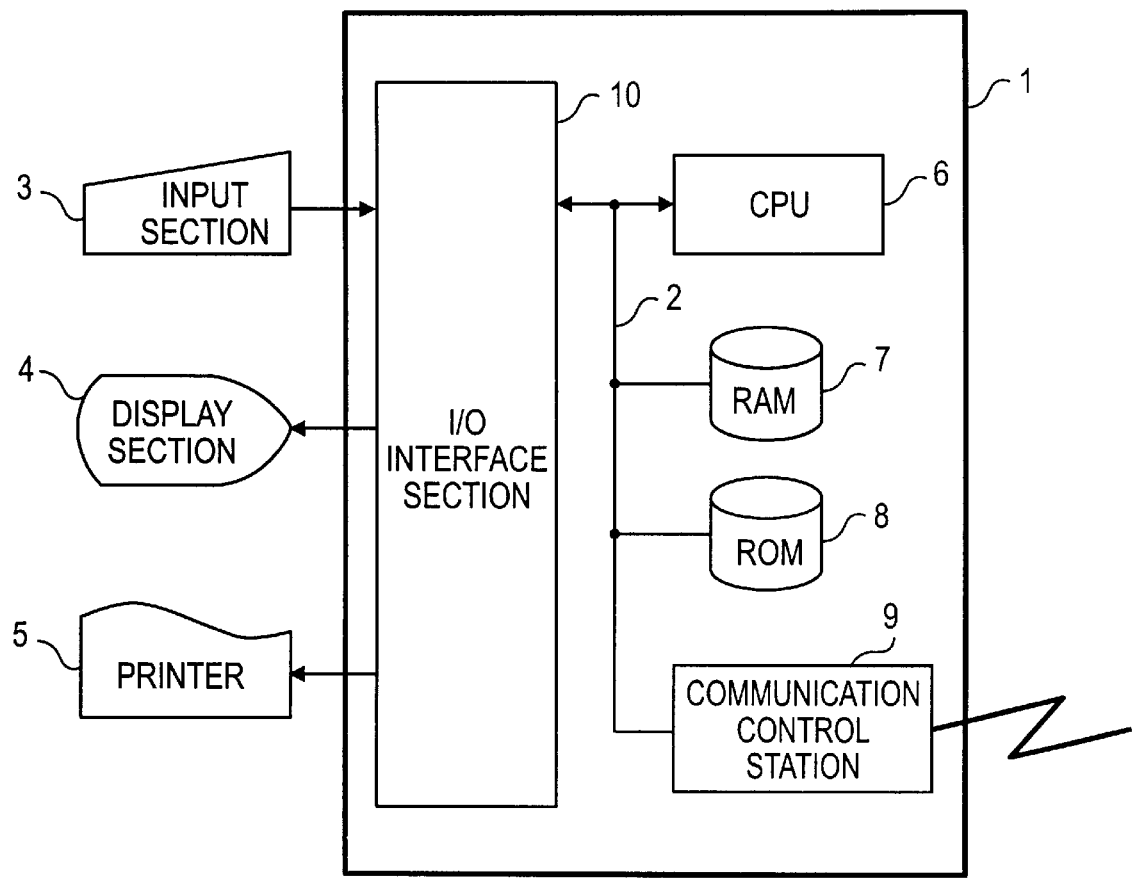
FIG. 6 is a block diagram of hardware of inference apparatus according to an embodiment of the present invention.

FIG. 6 is a block diagram of a computer system 1 (hardware) of inference apparatus according to one embodiment of the present invention. In FIG. 6, the computer system 1 is comprised of an input section 3 for inputting data (an instance set, a new instance) and various instructions, a display section 4 for displaying the answer to a question (a new instance) and a rule, a printer 5, a CPU 6, a random-access memory (RAM) 7, a read-only memory (ROM) 8, a communication control section 9 and an I/O interface section 10 which is connected with the input section 3, the display section 4 and the printer 5. In the computer system 1, the I/O interface section 10 is connected with the CPU 6, the RAM 7, the ROM 8 and the communication control section 9 through a bus 2. The RAM 7 is comprised of a first data file and a second data file (not shown in FIG. 6). The first data file stores the instance set (plural instances) from which the rules (logical proposition) are generated. The second data file stores the new instance as the question. The instance set and the new instance are updated and edited through the input section 3. The ROM 8 stores a program for processing the instance set and the new instance, i.e., converting an attribute-value to first and second data expressions, calculating parameters, generating rules and predicting the answer. The processing is executed by the CPU 6.

Figure 7:
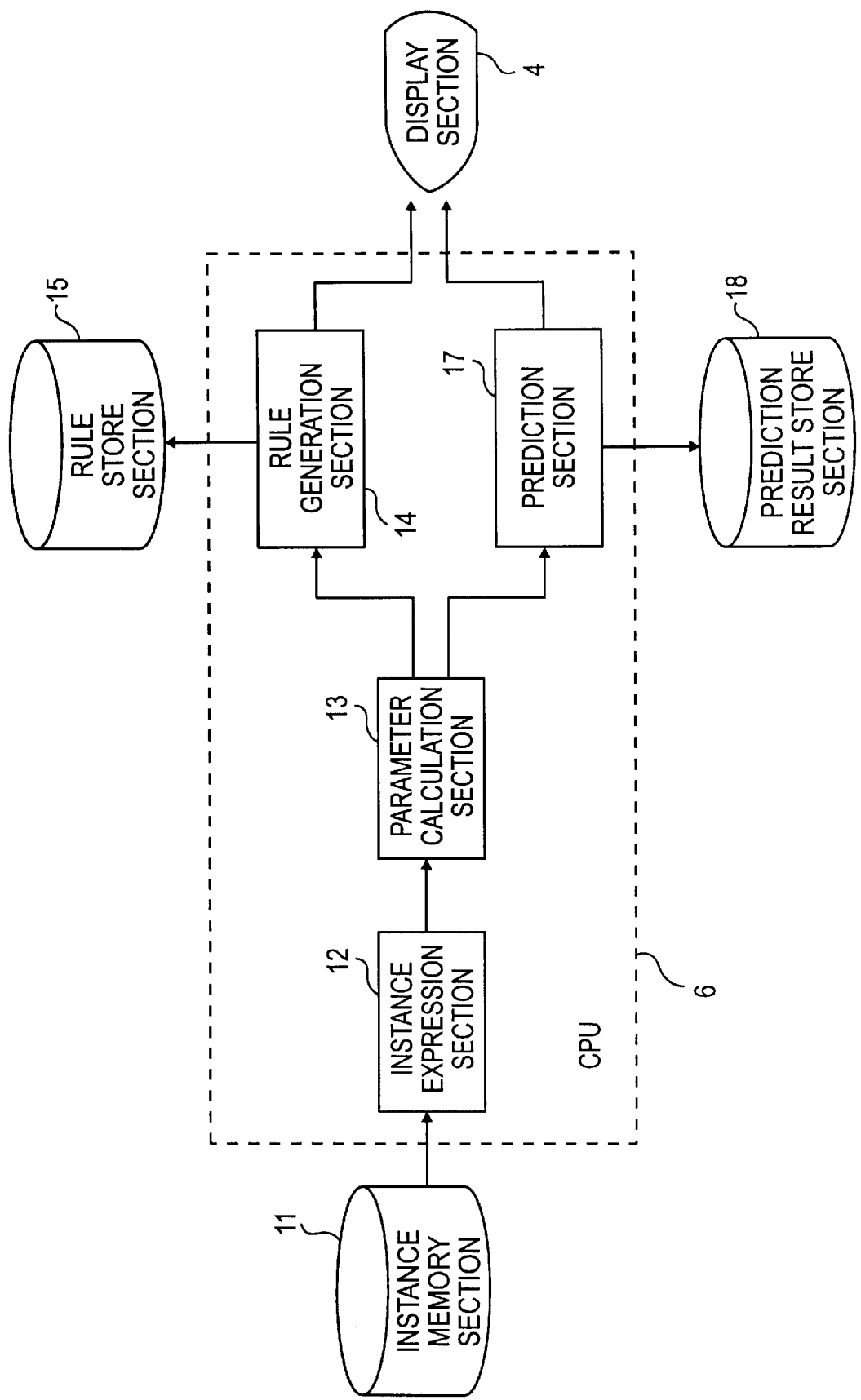
FIG. 7 is a block diagram of the inference apparatus according to the embodiment of the present invention.

FIG. 7 is a more detailed block diagram of the functional blocks of the inference apparatus shown in FIG. 6. In FIG. 7, an instance memory section 11 stores the instance set each of which is comprised of attribute-values and class. An instance expression section 12 reads the instance set from the instance memory section 11 and converts the attribute-value to a first data expression or second data expression. If the attribute-value is discrete-value, it is converted to "0" or "1", which is represented as {0,1} and called a first data expression. If the attribute-value is a continuous-value, it is converted to a real number which is greater than "0" and less than "1", which is represented as [0,1] and called a second data expression. A parameter calculation section 13 reads the instance set from the instance expression section 12 and generates a prediction formula for predicting the class of the new instance according to the attribute-value of the instance set. The parameter calculation section 13 calculates a coefficient corresponding to each variable of the prediction formula by using the attribute-value which is converted to the first data expression or second data expression. (The prediction formula is represented as a linear function)

A rule generation section 14 generates rules (logical proposition) according to the prediction formula, as described bellow. Then, the rules are stored in a rule store section 15 as knowledge or outputted through the display section 4. A prediction section 17 predicts the class of the new instance by assigning an attribute-value of the new instance to the variable of the prediction formula. The new instance is supplied from the instance memory section 11 to the prediction section 17 in response to the user's instruction (not shown in FIG. 7). The class, which is predicted by the prediction section 17, is stored in a prediction result store section 18 or outputted through the display section 16. The processing of the rule generation section 14 and the prediction section 17 is selected alternatively by the user. Sections 11, 15, and 18 can be included in RAM 7 (FIG. 6).

Figure 8:
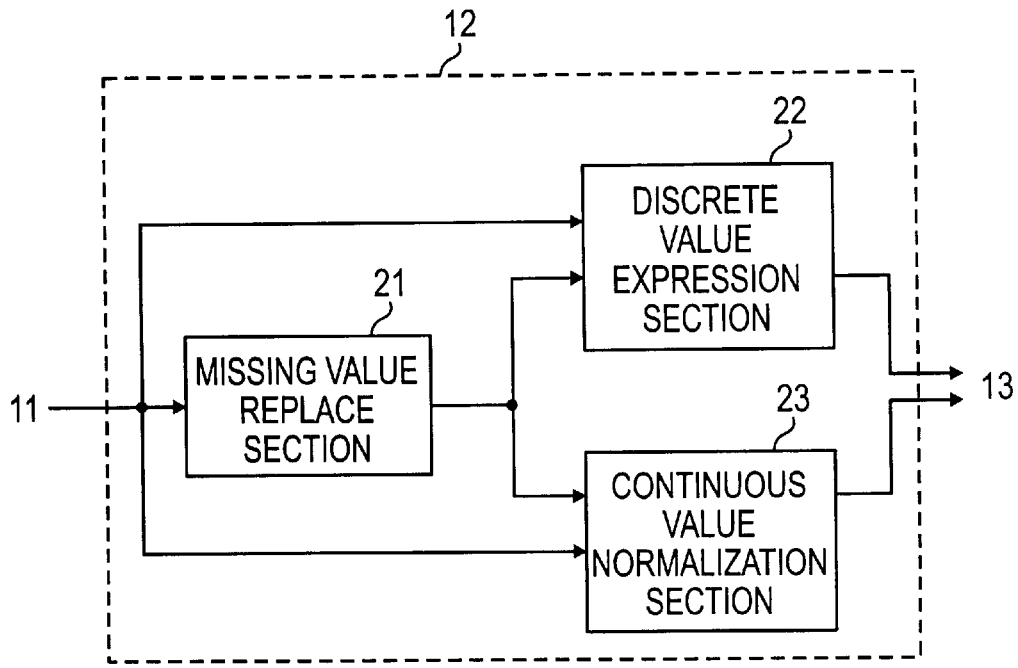
FIG. 8 is a block diagram of an instance expression section of the inference apparatus according to the embodiment of the present invention.

Next, the processing of each section of the inference apparatus according to the present invention will be explained in detail. FIG. 8 is a block diagram of the instance expression section 12. In FIG. 8, a missing value replace section 21 reads the instance set from the instance memory section 11 and decides whether at least one of the attribute-values of the instance set is missing or not. If at least one of attribute-value is missing, the missing value replace section 21 replaces the missing value by a computation value. A discrete value expression section 22 converts the attribute value of discrete type to the first data expression {0,1}. A continuous value normalization section 23 converts (normalizes) the attribute value of continuous type to the second data expression [0,1]. (In this case, the missing value is assumed to be unknown.)

Figure 9:
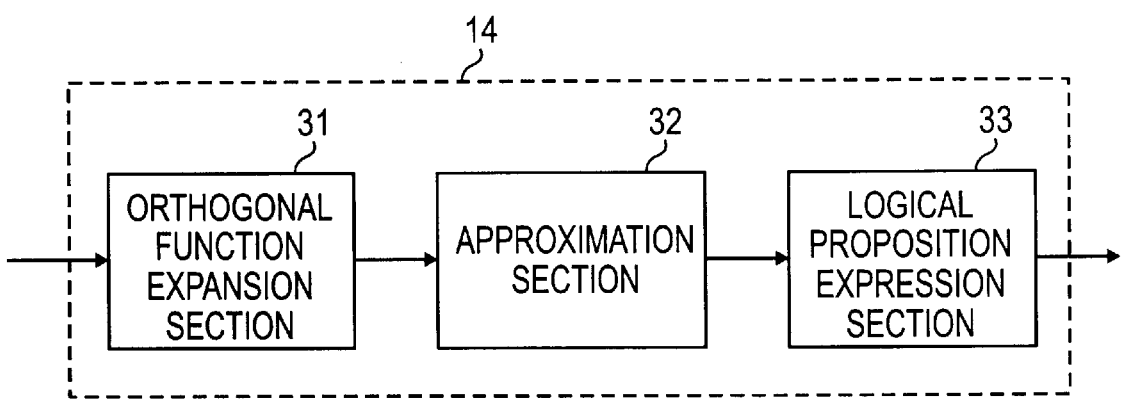
FIG. 9 is a block diagram of a rule generation section of the inference apparatus according to the embodiment of the present invention.

FIG. 9 is a block diagram of the rule generation section 14. In FIG. 9, an orthogonal function expansion section 31 reads the prediction formula from the parameter calculation section 13 and expands the prediction formula to the orthogonal function. An approximation section 32 approximates coefficients of the orthogonal function according to a predetermined threshold. A logical proposition expression section 33 generates a logical proposition (rule) from the orthogonal function whose coefficients are approximated.

Figure 10:
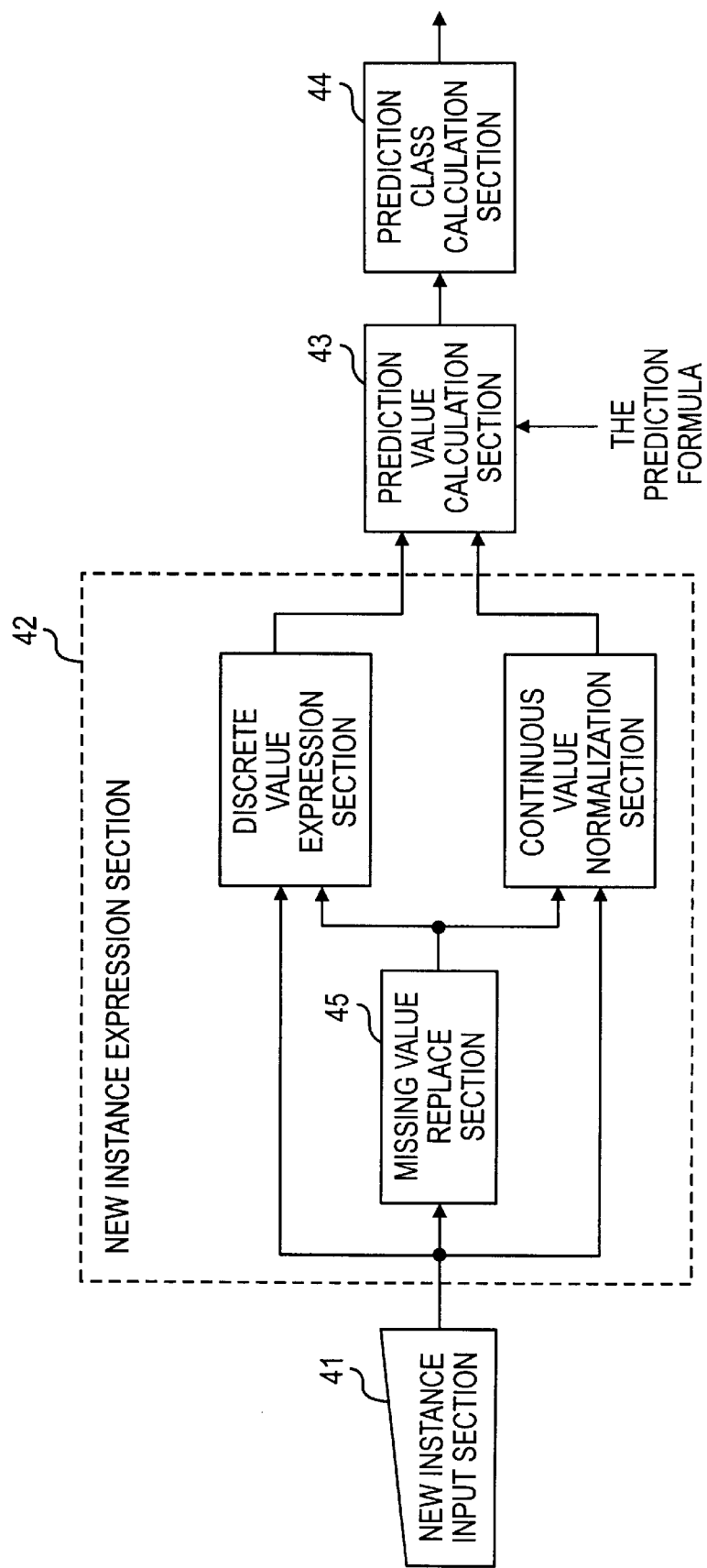
FIG. 10 is a block diagram of a prediction section of the inference apparatus according to the embodiment of the present invention.

FIG. 10 is a block diagram of the prediction section 17. In FIG. 10, a user inputs a new instance as a question through a new instance input section 41. The new instance is comprised of attribute-values, and a class of the new instance is unknoun. A new instance expression section 42 converts the attribute-value of the new instance to the first data expression {0,1} or the second data expression [0,1]. This processing is the same as performed by the instance expression section 12 shown in FIG. 8. However, a missing value replace section 45 is different from that of the instance expression section 12, as described bellow. A prediction value calculation section 43 reads the new instance, whose attribute-value is converted, from the new instance expression section 42 and calculates the prediction value of each class for the new instance according to the prediction formula which is calculated by the parameter calculation section 13. In this case, the attribute-value is assigned to each variable of the prediction formula. Then, a prediction class calculation section 44 compares the prediction values of all classes and selects a class corresponding to the largest value among the prediction values.

Figure 13:
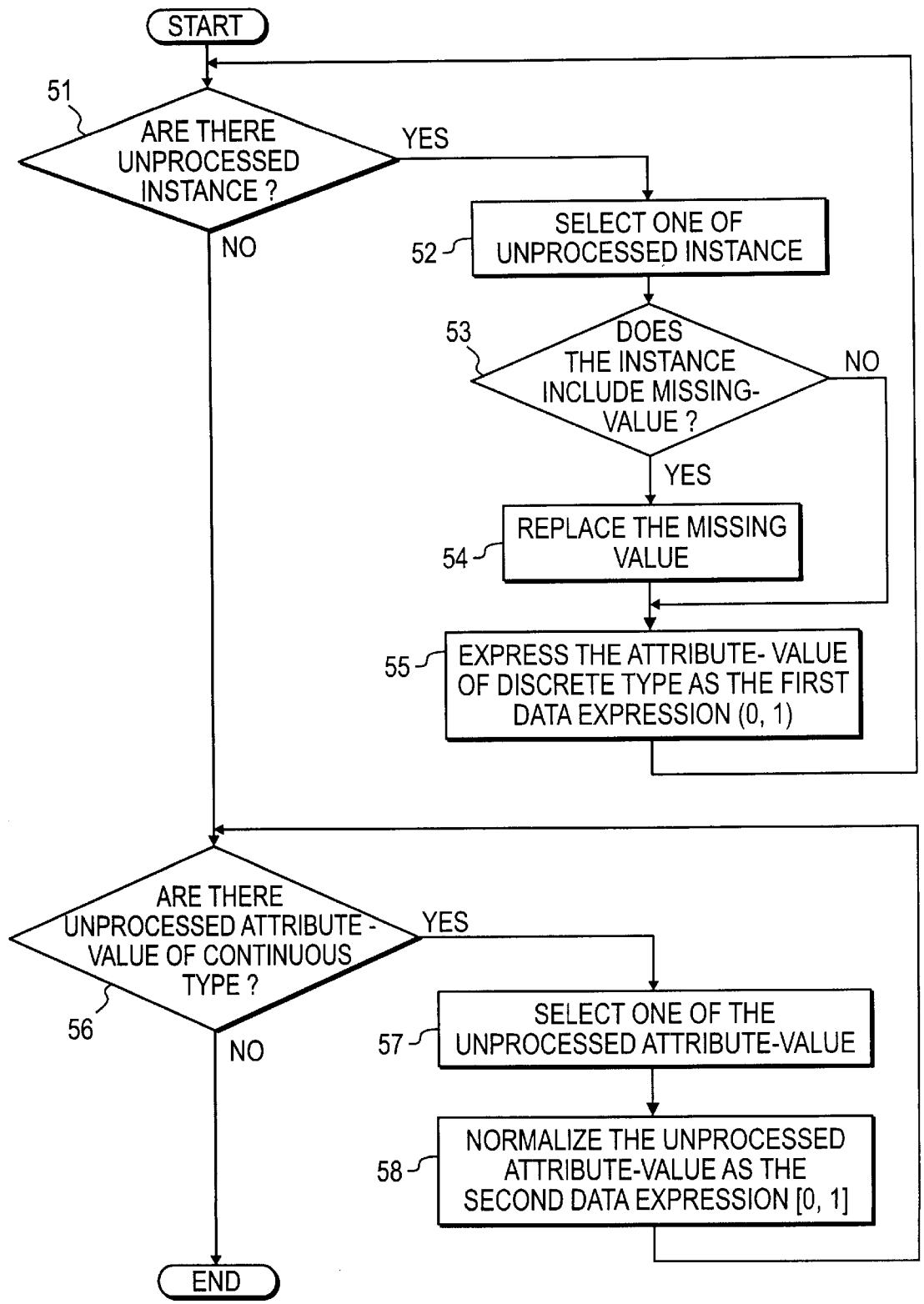
FIG. 13 is a flowchart of processing of the instance expression section according to an embodiment of the present invention.

Next, detailed processing will be explained with reference to an example. It is assumed that the instance memory section 11 previously stores the instance set in advance of inferring. The example is a problem which solves the relation among quality of product, production process and material for plural products which are manufactured. As for the problem, it has the purpose to acquire rules from the relation and to predict quality of a new product by using the rules. FIG. 11 is a schematic diagram of plural attributes and corresponding attribute-values of this example. In FIG. 11, "MATERIAL 1" "MATERIAL 2" "PROCESS" of attribute is the inference condition to determine the quality of the product. The attribute-value of "MATERIAL 1" and "MATERIAL 2" is a quantity of use as an actual numerical value, which is a continuous value. The attribute-value of "PROCESS" is "P" or "Q", which is a discrete value. "QUALITY" of attribute is a conclusion of this inference, in short, it is a class. The instance of this example is comprised of three attribute-values and the class (quality). FIG. 12 is an example of the instance set ($E_1 \sim E_6$) stored in the instance memory section 11. In FIG. 12, attribute-value "?" of "MATERIAL 2" of instance set $E_2$ is a missing-value, i.e., the attribute-value is unknown. FIG. 13 is a flowchart of processing of the instance expression section 12. In FIG. 13, the missing-value of the instance set is replaced and the attribute-value of discrete type is converted to the first data expression {0,1} at steps 51~55. Then, the attribute-value of continuous type is converted to the second data expression [0,1] at steps 56~58.

First, the instance expression section 12 decides whether there are unprocessed instance of the instance set in the instance memory section 11 (step 51). If there are unprocessed instance, the instance expression section 12 selects one unprocessed instance (step 52). In this example, it is assumed that the instance $E_1$ in FIG. 12 is selected. Next, the instance expression section 12 decides whether the instance includes a missing-value of the attribute-values (stpe 53). The instance $E_1$ does not include a missing-value as shown in FIG. 12. Then, the instance expression section 12 converts the attribute-value of discrete type to the first data expression {0,1} (step 55). For example, if process of the attribute-value is "P", a value "1" is assigned to the process "P" and a value "0" is assigned to the process "Q". If the instance includes at least three attribute-values of discrete type, the binary data is assigned in the same way. For example, if there are processes "P", "Q", "R" as the attribute-values, and if the process of the attribute-value of the instance is "Q", the value "0" is assigned to process "P", the value "1" is assigned to process "Q" and the value "0" is assigned to process "R". As a quality of class in the instance, the quality-value is "1" or "0". In short, the value "1" is assigned to corresponding quality and the value "0" is assigned to non-corresponding quality. For example, in FIG. 12, the class of each instance is "Excellent" or "GOOD". Therefore, from the view point of class "Excellent", the value "1" is assigned to the quality "Excellent" of instance and the value "0" is assigned to the quality "GOOD" of instance. From the view point of class "GOOD", the value "1" is assigned to the quality "GOOD" of instance and the value "0" is assigned to the quality "Excellent" of instance. Accordingly, the instance set whose quality-value is classified are generated as two groups.

After finishing the discrete-value expression of the instance "$E_1$", the instance expression section 12 decides whether there are other unprocessed instance again (step 51). It is assumed that the instance "$E_2$" in FIG. 12 is selected. The instance "$E_2$" includes a missing-value of the attribute-value "MATERIAL-2". Therefore, the instance expression section 12 replaces the missing-value (step 54). In this case, other instances whose class (quality) is the same as the instance of the missing-value are selected. For example, in FIG. 12, the class of the instance "$E_2$" which includes the missing-value is "GOOD". Therefore, the instances "$E_4$, $E_5$, $E_6$" whose class is "GOOD" are selected. Next, from the view point of the attribute corresponding to the missing-value of the instance, attribute-values of the other instances, each of which attribute is the same as the attribute of the missing-value, are extracted. Then, if the attribute-values are discrete type, the most frequently occurring value of the attribute-values is used for replacement of the missing-value. If the attribute-values are continuous type, the average value of the attribute-values is used for replacement of the missing-value. For example, in FIG. 12, the attribute of the missing-value is "MATERIAL 2" and attribute-values of "MATERIAL 2" of instances "$E_4$, $E_5$, $E_6$" are "40,10,20" which are continuous values. Therefore, the average value is determined as follows.

(40=10=20)/3+23.3

Accordingly, as the attribute-value of "MATERIAL 2" of the instance "$E_2$", the missing-value is replaced by value "23.3". After replacement of the missing-value, the attribute-value of descrete type is converted to the first data expression as the above-mentioned (step 55). In FIG. 12, the process of the instance "$E_2$" is "Q". Therefore, a value "0" is assigned to process "P" and a value "1" is assigned to process "Q".

In these ways, after replacement of all missing-values and converting all attribute-values of discrete type to the first data expression {0,1}, the attribute-value of continuous type is converted to the second data expression [0,1] (step 56~58). First, the instance expression section 12 decides whether there are unprocessed attribute-values of continuous type of the instance (step 56). If there is at least one unprocessed attribute-value of continuous type, one of the unprocessing attribute-value is selected (step 57). Next, the instance expression section 12 converts the attribute-value to the second data expression [0,1] (step 58). It is assumed that minimum value and maximum value among all attribute-values of continuous type of the same attribute are "MIN" and "MAX" respectively. The attribute-value "X" of continuous type of each instance is converted according to the following formula.

$$\frac{x - \text{MIN}}{\text{MAX} - \text{MIN}}$$

For example, in FIG. 12, the attribute-values of attribute "MATERIAL 1" are "5,20,50,30,50,10". In these values, the minimum value is 5 and the maximum value is 50. Therefore, each attribute-value is converted to a real number which is above "0" and below "1" as follows.

"0.000,0.333,1.000,0.555,1.000,0.111"

In this way, the attribute-values of all attributes of continuous type are converted to the second data expression.

FIG. 14 is a first group of instance set, in which attribute-values "MATERIAL 1" "MATERIAL 2" are converted to the second data expression, attribute-values "PROCESS" are converted to the first data expression and class "QUALITY" is converted to the first data expression from the view point of "EXCELLENT". FIG. 15 is second group of instance set, in which attribute-values are converted in the same way of FIG. 14 and class "QUALITY" is converted to the first data expression from the view point of "GOOD". Therefore. even if the instance set includes attribute-values of both discrete type and continuous type, the instance set is processed to predict the class of new instance and to generate rules as follows.

After the instance expression section 12 converts the attribute-values and class of the instance set as shown in FIG. 14 and FIG. 15, the parameter calculation section 13 calculates a parameter corresponding of each attribute of the prediction formula, which is to predict the class from the attribute-value of the new instance. The parameter is a coefficient accompanying variables in the prediction formula. For example, the coefficient of a linear function (prediction formula) is calculated by "least squares method". The least squares method is that, in the case data is approximated by lenear function, the linear function is determined so that a square of the difference between an estimated value and real value of the linear function is minimized. In general, the linear function formula is represented as follows with coefficients of variables $X_n(n+1,2,3 \ldots)$ as a,b,c. . . and constant term is C.

$$f(x)+ax_1=bx_2=cx_3=dx_4=\ldots=C \quad \ldots (1)$$

In the present embodiment, the attribute-value of instance is represented as follows because there are four attribute-values "MATERIAL 1", "MATERIAL 2", "PROCESS P", "PROCESS Q".

$$x_0+(x_{01},x_{02},x_{03},x_{04})$$

It is assumed that the coefficient corresponding to each attribute-value is a,b,c,d and the constant term is e. Therefore, the linear function of the present embodiment is represented as follows.

$$f(x_0)+ax_{01}+bx_{02}+cx_{03}+dx_{04}+e$$

In this case, it is assumed that the real attribute-value of the instance is represented as follows.

$$x_i(x_{i1},x_{i2},x_{i3},x_{i4}) \ (i+1,2,3\ldots)$$

In this case, the coefficients a,b,c,d are calculated so that value E of following formula is minimized.

$$\begin{aligned} E &= \sum (f(x_0) - f(x_i))^2 \\ &= \sum \{a(x_{01} - x_{i1}) + b(x_{02} - x_{i2}) + \\ & \quad c(x_{03} - x_{i3}) + d(x_{04} - x_{i4})\}^2 \end{aligned}$$

In this case, the coefficients a,b,c,d are determined according to the following differential calculus condition.

$$\frac{\partial E}{\partial a} = 0, \ \frac{\partial E}{\partial b} = 0, \ \frac{\partial E}{\partial c} = 0, \ \frac{\partial E}{\partial d} = 0$$

Figure 16:
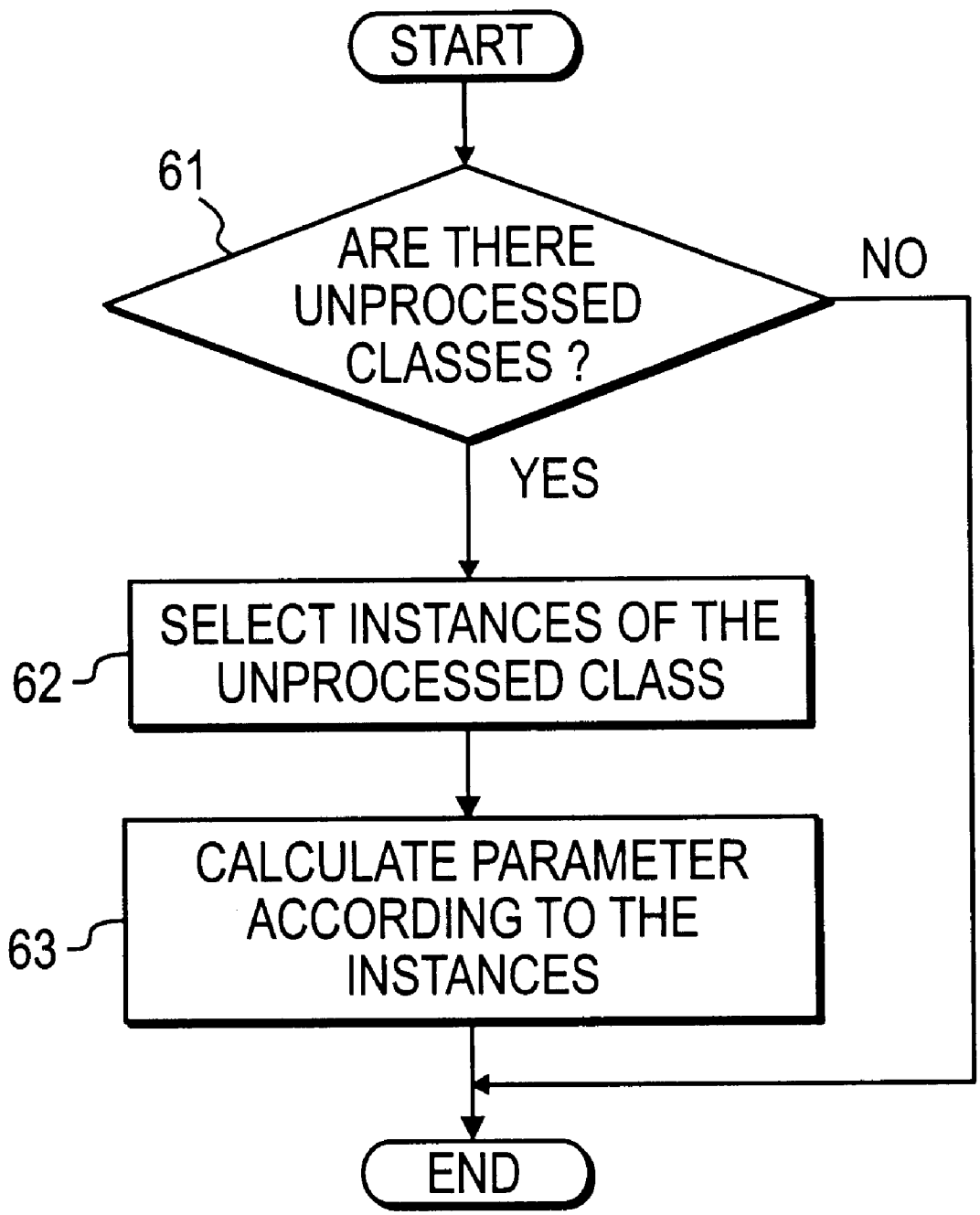
FIG. 16 is a flowchart of processing of a parameter calculation section according to an embodiment of the present invention.

FIG. 16 is a flowchart of processing of the parameter calculation section 13. In FIG. 16, the group of instances of each class is selected (step 61,62). In the example of FIG. 14 and FIG. 15, it is assumed that the group of instances whose quality is excellent is selected. In short, the group of instances shown in FIG. 14 is selected. Then, the coefficient (parameter) of the prediction formula in which the class is excellent is calculated (step 63) according to the least squares method. The following formula is the prediction formula which includes coefficients being calculated by the instances of FIG. 14.

$$f(x)+0.0899x_1+(-1.2073)x_2+(-0.1226)x_3+1.1226x_4+0.825 \quad \ldots (2)$$

Next, the group of instances whose quality is good is selected (return to step 61). In short, the group of instances shown in FIG. 15 is selected. Then, the coefficient (parameter) of prediction formula in which the class is good is calculated. The following formula is the prediction formula which includes coefficients being calculated by the instances of FIG. 15.

$$f(x)=(-0.0899)x_1+1.2073x_2+0.1226x_3+0.8774x_4+0.175 \quad \ldots (3)$$

Figure 17:
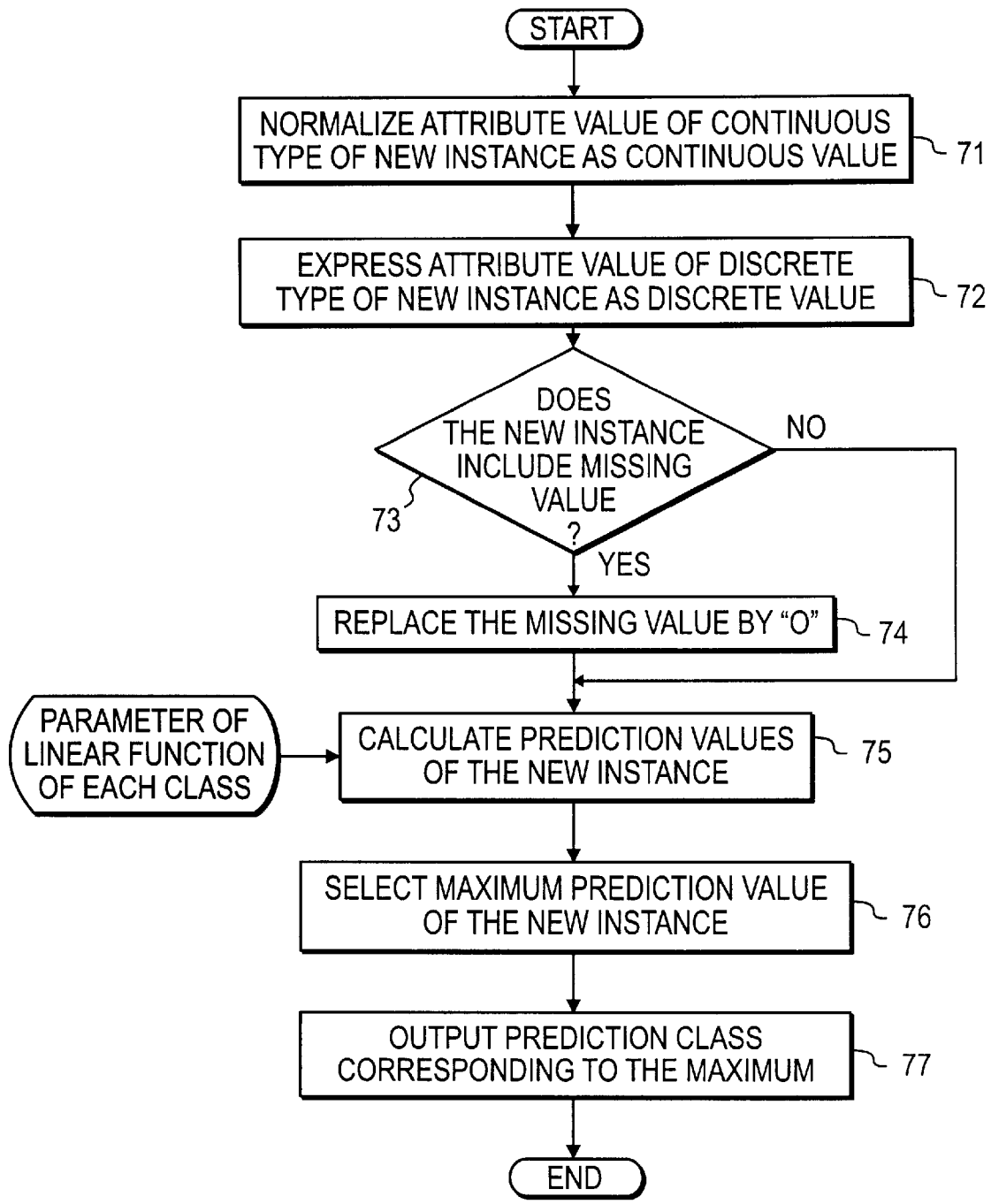
FIG. 17 is a flowchart of processing of the prediction section according to an embodiment of the present invention.
Figures 18, 19:
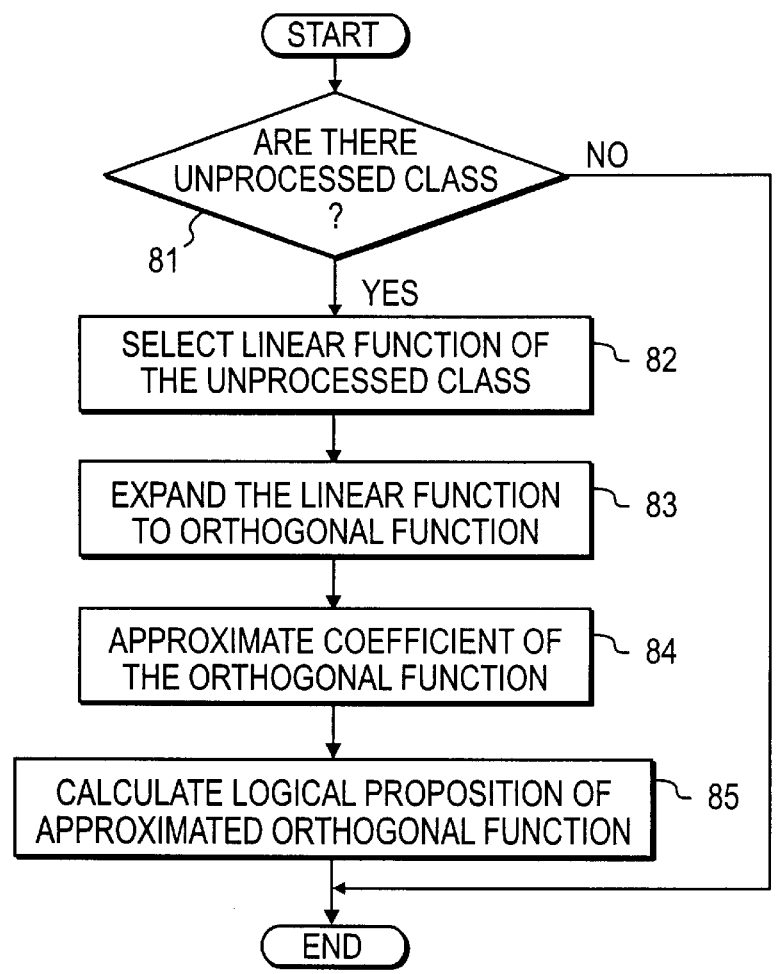
FIG. 18 is a schematic diagram of a new instance whose attribute-values are converted to first and second expression data.
FIG. 19 is a flowchart of processing of the rule generation section according to an embodiment of the present invention.

After calculating coefficients of the prediction formula, the user selects prediction of class of new instance or generation of rule of the instance set for each class. First, it is assumed that the user selects prediction of a class of new instance. FIG. 17 is a flowchart of processing of the prediction section 17. In FIG. 17, an attribute-value of continuous type of a new instance is converted (normalized) to the second data expression [0,1]. (step 71). Then, the attribute-value of discrete type of the new instance is converted to the first data expression {0,1} (step 72). Then, if the new instance includes a missing-value of the attribute-value, the missing-value is replaced as "0" (steps 73,74). FIG. 18 shows new instance whose attribute-value of continuous type is converted to the second data expression. In FIG. 18, the attribute-value of "PROCESS" of the new instance is missing. Therefore, attribute-values of "PROCESS P" "PROCESS Q" are replaced by "0". Then, attribute-values of the new instance which are converted are assigned to variables of the prediction formula of each class, and the prediction value of each class is calculated (step 75). The maximum prediction value among prediction values of each class is selected (step 76). Therefore, the class corresponding to the maximum prediction value is outputted as the class of the new class (step 77). For example, if attribute-values of the new instance shown at the right side of FIG. 18 are assigned to variables of the prediction formula (2)(3), the prediction value is calculated as shown in expressions (4) and (5) respectively.

$$(0.0899) \bullet 0.333 + (-1.2073) \bullet 0.166 + \qquad (4)$$
$$(-0.1226) \bullet 0 + (1.1226) \bullet 0 + 0.825 = 0.6545$$

$$(-0.0899) \bullet 0.333 + (1.2073) \bullet 0.166 + \qquad (5)$$
$$(0.1226) \bullet 0 + (0.8774) \bullet 0 + 0.175 = 0.3455$$

In this case, the prediction value (4) is larger than the prediction value (5). Therefore, the class of new instance in FIG. 18 is "EXCELLENT" corresponding to class of the prediction formula (2).

Next, it is assumed that the user selects generation of a rule of the instance set of each class. FIG. 19 is a flowchart of processing of the rule generation section 14. First, the linear function (prediction formula) of each class is selected (steps 81, 82) and the linear function is expanded to an orthogonal function (step 83). In the linear function (1), four variables $(1-x_1)$, $(1-x_2)$, $(1-x_3)$, $(1-x_4)$, are generated by four original variables $x_1$, $x_2$, $x_3$, $x_4$. By all combination of these coefficients $x_1$, $x_2$, $x_3$, $x_4$, $(1-x_1)$, $(1-x_2)$, $(1-x_3)$, $(1-x_4)$, each variable of the orthogonal function is determined. It is assumed that (1-X) is the negation of X, which is represented as "(NOT)X". In the orthogonal function, each term (variable) corresponds to an atom of the logical function. The atom is the minimum unit of logical function. For example, as for two variables X,Y, there are four atoms XY, X(NOT)Y, (NOT)XY, (NOT)X(NOT)Y.

The orthogonal function of the linear function (2) is shown in the following formula (6).

$$y = 0.708 x_1 x_2 x_3 x_4 + (-0.415) x_1 x_2 x_3 (1-x_4) + 0.830 x_1 x_2 (1-x_3) x_4 + \qquad (6)$$
$$(-0.292) x_1 x_2 (1-x_3)(1-x_4) + 1.915 x_1 (1-x_2) x_3 x_4 +$$
$$0.792 x_1 (1-x_2) x_3 (1-x_4) + 2.037 x_1 (1-x_2)(1-x_3) x_4 +$$
$$0.915 x_1 (1-x_2)(1-x_3)(1-x_4) + 0.618(1-x_1) x_2 x_3 x_4 +$$
$$(-0.505)(1-x_1) x_2 x_3 (1-x_4) + 0.704(1-x_1) x_2 (1-x_3) x_4 +$$

-continued
$$(-0.382)(1-x_1) x_2 (1-x_3)(1-x_4) + 1.825(1-x_1)(1-x_2) x_3 x_4 +$$
$$0.702(1-x_1)(1-x_2) x_3 (1-x_4) + 1.948(1-x_1)(1-x_2)(1-x_3) x_4 +$$
$$0.825(1-x_1)(1-x_2)(1-x_3)(1-x_4)$$

In the above formula (6), the coefficient accompanying each variable is calculated as follows. In the linear function (2), the combination of unit value "1" "0" is assigned to variables "$x_1$, $x_2$, $x_3$, $x_4$" as following 16 cases.

$(x_1, x_2, x_3, x_4)=(1,1,1,1) \rightarrow f(x)=0.708$ $(x_1, x_2, x_3, x_4)=(1,1,1,0) \rightarrow f(x)=-0.415$ $(x_1, x_2, x_3, x_4)=(1,1,0,1) \rightarrow f(x)=0.830$ $(x_1, x_2, x_3, x_4)=(1,1,0,0) \rightarrow f(x)=-0.292$ $(x_1, x_2, x_3, x_4)=(1,0,1,1) \rightarrow f(x)=1.915$ $(x_1, x_2, x_3, x_4)=(1,0,1,0) \rightarrow f(x)=0.792$ $(x_1, x_2, x_3, x_4)=(1,0,0,1) \rightarrow f(x)=2.037$ $(x_1, x_2, x_3, x_4)=(1,0,0,0) \rightarrow f(x)=0.915$ $(x_1, x_2, x_3, x_4)=(0,1,1,1) \rightarrow f(x)=0.618$ $(x_1, x_2, x_3, x_4)=(0,1,1,0) \rightarrow f(x)=-0.505$ $(x_1, x_2, x_3, x_4)=(0,1,0,1) \rightarrow f(x)=0.740$ $(x_1, x_2, x_3, x_4)=(0,1,0,0) \rightarrow f(x)=-0.382$ $(x_1, x_2, x_3, x_4)=(0,0,1,1) \rightarrow f(x)=1.825$ $(x_1, x_2, x_3, x_4)=(0,0,1,0) \rightarrow f(x)=0.702$ $(x_1, x_2, x_3, x_4)=(0,0,0,1) \rightarrow f(x)=1.948$ $(x_1, x_2, x_3, x_4)=(0,0,0,0) \rightarrow f(x)=0.825$ In this way, 16 coefficients corresponding to 16 variables are determined respectively.

Secondly, each coefficient of the orthogonal function (6) is approximated relative to a threshold "0.5" (Step 84). In short, if the coefficient is larger than "0.5", the coefficient is decided to be "1". If the coefficient is smaller than "0.5", the coefficient is decided to be "0". Therefore, the orthogonal function (6) is approximated as the following formula (7).

$$y = x_1 x_2 x_3 x_4 + x_1 x_2 (1-x_3) x_4 + x_1 (1-x_2) x_3 x_4 + \qquad (7)$$
$$x_1 (1-x_2) x_3 (1-x_4) + x_1 (1-x_2)(1-x_3) x_4 +$$
$$x_1 (1-x_2)(1-x_3)(1-x_4) + (1-x_1) x_2 x_3 x_4 + (1-x_1) x_2 (1-x_3) x_4 +$$
$$(1-x_1)(1-x_2) x_3 x_4 + (1-x_1)(1-x_2) x_3 (1-x_4) +$$
$$(1-x_1)(1-x_2)(1-x_3) x_4 + (1-x_1)(1-x_2)(1-x_3)(1-x_4)$$

Then, if the above orthogonal function (7) is arranged, the logical function is generated as follows (step 85).

$$(1-x_2)+x_2 x_4 \qquad \ldots (8)$$

In the above logical function, "$x_2$, $x_4$" are variables and $(1-x_2)$ is negation of "$x_2$" ((NOT) $x_2$). Therefore, the logical function (8) is expressed as logical proposition (9).

$$(\text{NOT}) \; x_2 \; V \; x_2 \; x_4 \qquad \ldots (9)$$

In the above logical proposition (9), "(NOT)" is negation, "V" is logical sum, "$x_2$" is "MATERIAL 2" and "$x_4$" is "PROCESS Q". Therefore, the logical proposition (9) is a rule which if "use-quantity of material 2 is a little" or "(use-quantity of material 2 is much) and (process is Q)", the quality is excellent.

In the same way, as for the linear function whose quality is good, the following logical proposition (10) is generated.

$$x_2 \lor (NOT) \; x_2 \; x_4 \qquad \ldots (10)$$

The logical proposition (10) is a rule which if "use-quantity of material 2 is much" or "(use-quantity of material 2 is a little) and (process is Q)", the quality is good. These rules are outputted on the display as shown in FIG. 20 A and FIG. 20 B respectively.

Another embodiment of the invention is described next.

Figure 21:
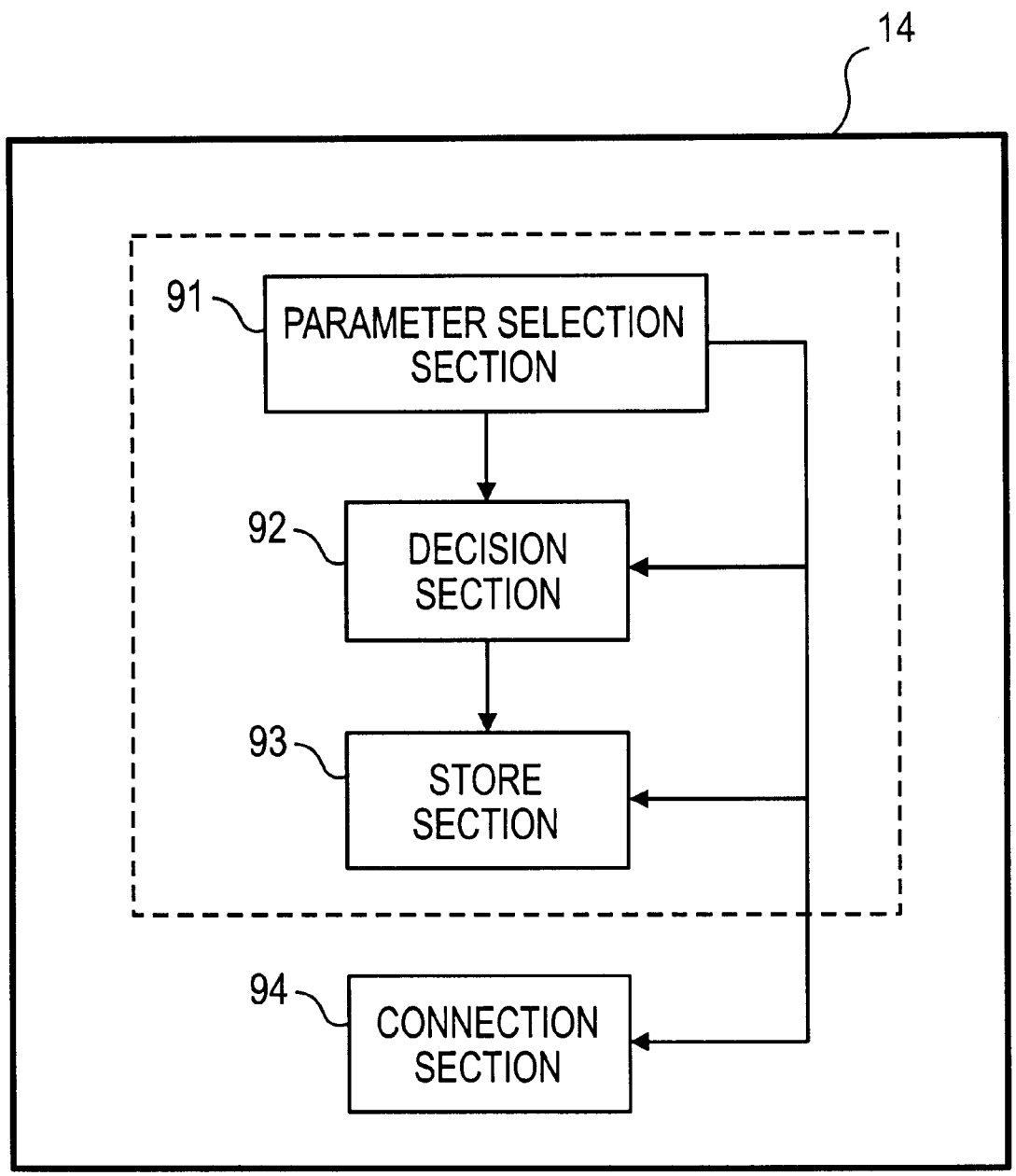
FIG. 21 is a block diagram of the rule generation section of the inference apparatus according to another embodiment of the present invention.
Figure 22:
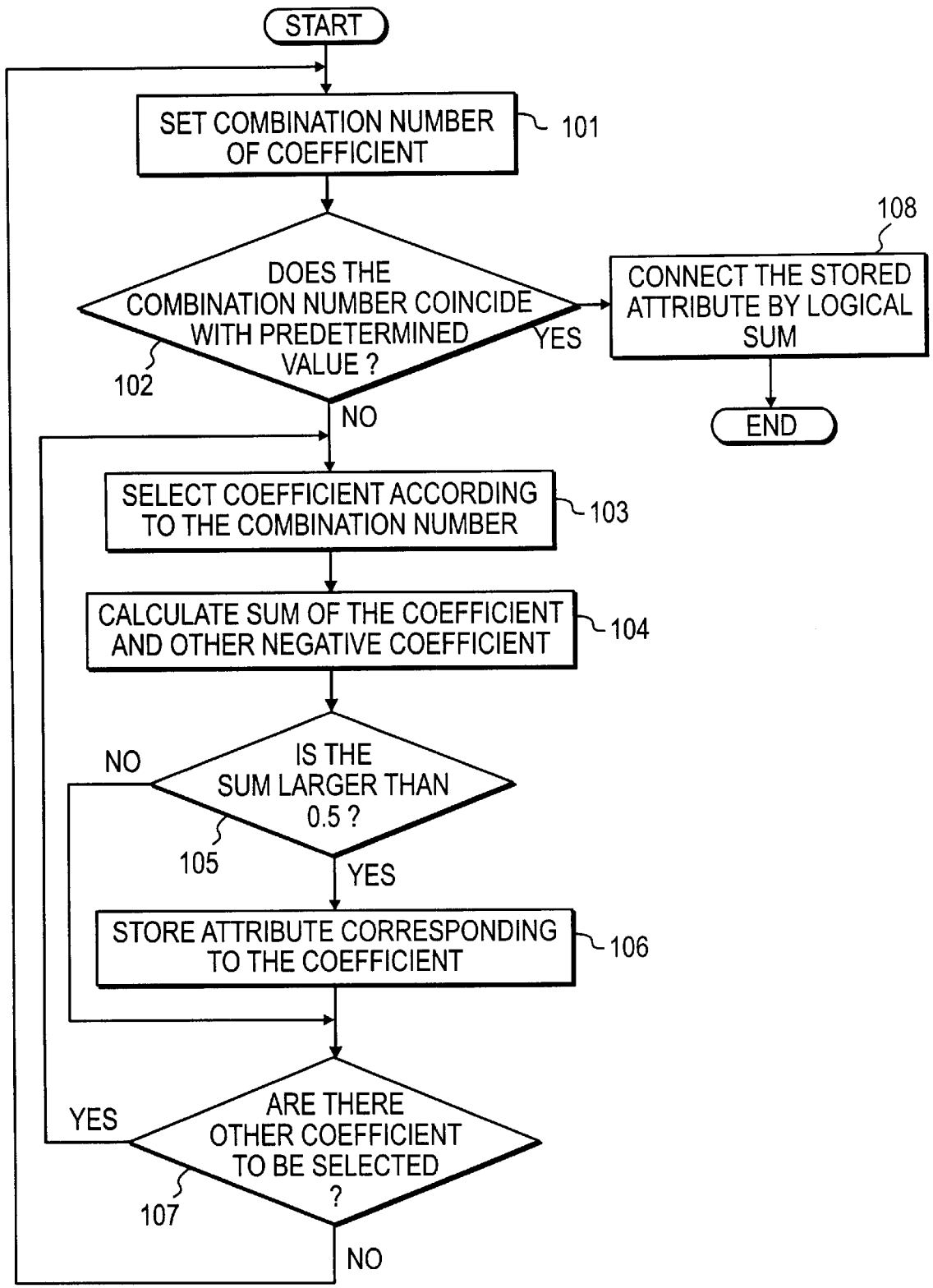
FIG. 22 is a flowchart of processing of the rule generation section according to another embodiment of the present invention.

In case all attribute-values of instance set are discrete type (no attribute-values of continuous type), a rule of the instance set is generated as follows. In this embodiment, the instance expression section 12, the parameter calculation section 13, the prediction section 17 are the same of those of the first embodiment. However, the calculation quantity of the rule generation section 14 is reduced in comparison with that of the first embodiment. FIG. 21 is a block diagram of the rule generation section 14 of this embodiment. FIG. 22 is a flowchart of processing of the rule generation section 14 according to this embodiment.

It is assumed that the number of attribute of the instance is n. In this case, the parameter calculation section 13 calculates n coefficients (parameters) "$P_1, \ldots, P_n$". A combination number of parameters is set to 1 (Step 101). The rule generation section 14 generates rule by combining coefficients corresponding to the combination number. In this embodiment, the initialization number of the combination number is 1 and the combination number is incremented one by one. Then, if the combination number coincides with a predetermined number N, the processing finishes (step 102).

First, the parameter selection section 91 selects "$P_1$" and selects all negative values from $P_2, \ldots, P_n$ if at least one negative value is included in $P_2, \ldots, P_n$ (step 103). In arbitrary combination including $P_1$ from $P_1, \ldots, P_n$, the combination of coefficients whose sum is minimum among all combination including $P_1$ should be selected. For example, it is assumed that coefficient $P_1$ is compared with the combination of coefficients $P_1 + P_2$. If coefficient $P_2$ is positive value, $P_1$ is smaller than $P_1 + P_2$. But if coefficient $P_2$ is negative value, $P_1 + P_2$ is smaller than $P_1$. Therefore, based on determining the sum of the coefficients including $P_1$, which is minimum among sum of coefficients of each combination, all negative coefficients from $P_2, \ldots, P_n$ are selected.

Secondly, the decision section 92 calculates sum of coefficients which are selected by the parameter selection section 91 (step 104) and compares the sum with threshold 0.5 (step 105). As above-mentioned, the combination of coefficients whose sum is minimum among all combinations including $P_1$ was selected. Then, the minimum sum of the combination of coefficients including $P_1$ is compared with 0.5.

To generate a rule, if the minimum sum of combination of coefficients including $P_1$ is larger than 0.5, the minimum sum is approximated by 1. In this case, the attribute corresponding to coefficient $P_1$ remains. If the minimum sum of the combination of coefficients including $P_1$ is smaller than 0.5, the minimum sum is approximated by 0. In this case, the attribute corresponding to coefficient $P_1$ does not remain. Therefore, in this embodiment, the store section 93 stores the attribute corresponding to coefficient $P_1$ if the minimum sum is larger than 0.5 (step 106). Then, the parameter selection section 91 decides whether other coefficients to be selected are included in coefficients $P_1, \ldots, P_n$ (step 107). If an other coefficient is to be selected is included, the parameter selection section 91 selects the other coefficient. The other coefficient to be selected is the coefficient which is not selected from all coefficients in case the combination number is the same. In this example, coefficients $P_2, \ldots, P_n$ except for $P_1$ are not selected in spite of the combination number being 1. Therefore, the parameter selection section 91 selects the next coefficient $P_2$, and selects all negative coefficients from $P_1, \ldots P_n$ except for $P_2$ if at least one negative coefficient is included in coefficients $P_1 \ldots P_n$ except for $P_2$ (step 103). The decision section 92 calculates the sum of the coefficients being selected (step 104). The store section 93 stores the attribute corresponding to coefficient $P_2$ if the sum is larger than 0.5 (step 105, 106).

In the same way, the above-processing is executed for other coefficients $P_3, \ldots, P_n$. When the processing for coefficient $P_n$ finishes, there are no other coefficient to be selected among all coefficients $P_1, \ldots, P_n$ (step 107). Therefore, the combination number is set to 2 (step 101). The parameter selection section 91 selects two coefficients $P_i, P_j$ (1<i,j<n) and selects all negative coefficients from $P_1, \ldots, P_n$ except for $P_i, P_j$ (step 103). However, coefficients whose attribute is already stored is not selected. The decision section 92 calculates the sum of coefficients being selected (step 104) and compares the sum with threshold 0.5 (step 105). If the sum is larger than 0.5, the store section 93 stores the logical product of two attributes corresponding to coefficients $P_i, P_j$ (step 106).

In short, the logical product of attributes corresponding to $P_i, P_j$ is stored if the following decision formula is satisfied.

$$i_k \Sigma Pij + \Sigma Pj > 0.5 \; i_1 1 \leq j \leq n, \; j \neq i1, \ldots, ik, \; Pj \leq 0$$

If the combination number coincides with the predetermined value (step 102), the connection section 94 connects the attribute and the logical product of attributes, which are stored, as a logical sum (step 108). This is the rule generated from instance set which include n attributes and coefficients $P_1, \ldots, P_n$.

Next, processing of the parameter calculation section 13 and the rule generation section 14 is explained in detail. For example, it is assumed that the number of attributes is five and the prediction formula is as follows.

$$f(x) = 0.1x_1 + 0.1 \; x_2 + 0.6 \; x_3 + 0.73x_4 + 0.06x_5$$

In short, this prediction formula includes five coefficients "$P_1, \ldots, P_5$ as follows.

A: $P_1 = 0.1$

B: $P_2 = 0.1$

C: $P_3 = 0.6$

D: $P_4 = 0.73$

E: $P_5 = 0.06$

"A,B,C,D,E" are attributes corresponding to each coefficient. First, the combination number of coefficients is set to 1. The parameter selection section 91 selects coefficient $P_1$ and decides whether the negative coefficient is included in other coefficients $P_2 \ldots P_5$. In this example, the negative coefficient is not included. Therefore, the coefficient $P_1$ is only supplied to the decision section 92. The decision section 92 compares the coefficient $P_1$ with the threshold 0.5. In this case, the coefficient $P_1$ (=0.5) is smaller than 0.5.

Therefore, the attribute "A" corresponding to the coefficient $P_1$ is not stored in the store section 93. In the same way, the attribute $P_2$ (=0.1) is smaller than 0.5. Therefore, the attribute "B" corresponding to the coefficient $P_2$ is not stored. However, the coefficient $P_3$ (=0.6) is larger than 0.5 and the coefficient $P_4$ (=0.73) is larger than 0.5. Therefore, the attributes "C" and "D" are stored. The coefficient $P_5$ (=0.06) is smaller than 0.5. Therefore, the attribute "E" is not stored. Then, the combination number of coefficient is set to 2. The parameter selection section 91 selects two coefficients $P_1$, $P_2$. In this case, the negative coefficient is not included in other coefficients $P_3$, $P_4$, $P_5$. Therefore, two coefficients $P_1$, $P_2$ are only supplied to the decision section 92. The decision section 92 calculates the sum of two coefficients $P_1$, $P_2$ and compares the sum(=0.2) with threshold 0.5. The sum(=0.2) is smaller than 0.5. Therefore, the logical product of the attributes "AB" is not stored. Next, the parameter selection 91 selects two parameters $P_1$, $P_5$ because parameters $P_3$, $P_4$ are already stored. The decision section 92 calculates the sum of two coefficients $P_1$, $P_5$ and compares the sum(=0.16) with threshold 0.5. The sum(=0.16) is smaller than 0.5. Therefore, the logical product of the attributes "AE" is not stored. In the same way, all combinations of two coefficients except for $P_3$, $P_4$ are decided not to satisfy the above condition. Therefore, the logical product of two attributes is not stored at all. Then, the combination number of coefficients is set by 3. In this case, the parameter selection section 91 selects three coefficients $P_1$, $P_2$, $P_5$ because other coefficients $P_3$, $P_4$ are already stored. The decision section 92 calculates the sum of three coefficients $P_1$, $P_2$, $P_5$ and compares the sum(=0.26) with the threshold 0.5. The sum(=0.26) is smaller than 0.5. Therefore, the logical product of three attributes "ABE" is not stored. In this example, if the combination number of coefficients is set to 4, it is assumed that the combination number 4 coincides with the predetermined number 4. The connection section 94 connects the stored attributes "C" "D", by logical sum. Therefore, a rule "C V D" is generated from the rule generation section 14.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. Inference apparatus for predicting a class of new instance, wherein the new instance includes an attribute-value, comprising;

instance memory means for storing a plurality of instances, each of which includes a class and an attribute-value, wherein a data type of the attribute-value is a discrete type of a continuous type;

instance expression means for converting the attribute-value of the discrete type to a first data expression and the attribute-value of the continuous type to a second data expression, and for converting the class of each instance to the first data expression from a view point of each class, wherein the plurality of the instances is represented as plural groups by unit of class, and the number of the groups is equal to the number of the classes;

parameter calculation means for generating a linear function as a prediction formula of each class in which the attribute-value of the instance corresponds to a variable, and for calculating a coefficient accompanying each variable in the linear function by assigning one of the first data expression and the second data expression of the instance by unit of the group to corresponding variables in the linear function whose class is the same as the group, wherein the linear function of each class is determined; and prediction means for assigning the attribute-value of the new instance to the corresponding variable of the linear function of each class, and for predicting the class of the new instance by comparing function values among all linear functions of all classes.

2. The inference apparatus according to claim 1, wherein said instance expression means includes means, if the attribute—value of a selected instance of the instance set is missing, for calculating a provisional attribute—value in accordance with corresponding attribute—values of other instance of the instance set whose class is the same as the selected instance, and for replacing the missing value with the provisional attribute—value.

3. The inference apparatus according to claim 1, wherein said first data expression is a binary expression.

4. The inference apparatus according to claim 1, wherein said second data expression is a real number which is normalized between predetermined minimum and maximum values.

5. The inference apparatus according to claim 1, wherein said prediction means includes means, if the attribute—value of the new instance is missing, for replacing the missing value with "0" as the attribute—value.

6. The inference apparatus according to claim 1, wherein said prediction means includes means, when the attribute—value of the new instance is assigned a variable in the linear function, for converting from the attribute—value of discrete type of the new instance to the first data expression and from the attribute—value of continuous type of the new instance to the second data expression.

7. The inference apparatus according to claim 1, wherein said prediction means includes means for selecting a maximum function value among function values of the linear functions of all classes and selects the class of the linear function corresponding to the maximum function value as the predicted class.

8. Inference apparatus for generating a rule which is common to instances of a class, comprising;

instance memory means for storing a plurality of instances, each of which includes a class and an attribute-value, wherein a data type of the attribute-value is a discrete type or a continuous type;

instance expression means for converting the attribute-value of the discrete type to a first data expression and the attribute-value of the continuous type to a second data expression, and for converting the class of each instance to the first data expression from a view point of each class, wherein the plurality of the instances is represented as plural groups by unit of class, and the number of the groups is equal to the number of the classes;

parameter calculation means for generating a linear function as a prediction formula of each class in which the attribute-value of the instance corresponds to a variable, and for calculating a coefficient accompanying each variable in the linear function by assigning one of the first data expression and the second data expression of the instance by unit of the group to corresponding variables in the linear function whose class is the same as the group, wherein the linear function of each class is determined; and rule generation means for determining coefficients of an orthogonal function by orthogonal expansion of each variable in the linear function of each class, for expressing each coefficient of the orthogonal function of each class as the first data expression, and for calculating a logical proposition as the rule from the orthogonal function of each class including each coefficient of the first data expression, wherein the logical proposition is the rule of each class.

9. The inference apparatus according to claim 8, wherein said instance expression means includes means, if the attribute—value of a selected instance is missing, for calculating a provisional attribute—value in accordance with corresponding attribute—values of other instance whose class is the same as the selected instance, and for replacing the missing value with the provisional attribute—value.

10. The inference apparatus according to claim 8, wherein said first data expression is a binary expression.

11. The inference apparatus according to claim 8, wherein said second data expression is a real number which is normalized between predetermined minimum and maximum values.

12. The inference apparatus according to claim 8, wherein said rule generation means includes means for generating a negation of each variable of the linear function of each class, for combining each negation of each variable with each variable of the linear function for all combinations as each variable of the orthogonal function, and for calculating a coefficient corresponding to each variable of the orthogonal function by assigning a unit value to each variable of the linear function.

13. The inference apparatus according to claim 12, wherein said rule generation means includes means for converting each coefficient of the orthogonal function to binary "0" or "1" by comparison with a threshold value "0.5", and for arranging the orthogonal function including the binary coefficients to generate the logical proposition.

14. The inference apparatus according to claim 8, wherein said rule generation means includes means, if the data type of the attribute—value of the instance set is the discrete type, for selecting each cofficient of the linear function to add to other negative coefficients of the lenear function, for comparing the sum of the coefficients and the other negative cofficients with a threshold "0.5", and for storing the attribute corresponding to each coefficient of the linear function if the sum is larger than the threshold.

15. The inference apparatus according to claim 14, wherein said selecting means includes means for selecting plural coefficients of the linear function to add to other negative coefficient of the linear function when attributes corresponding to the plural coefficients have not been stored, for comparing the sum of the plural coefficients and the other negative coefficients with the threshold 0.5, and for storing the attributes corresponding to the plural coefficients of the linear function as a logical sum if the sum is larger than the threshold.

16. An inference method for predicting a class of a new instance which includes an attribute-value according to a previously stored plurality of instances, each includes a class and an attribute-value, wherein a data type of the attribute-value is a discrete type of a continuous type, said method comprising:

converting the attribute-value of the discrete type to a first data expression and the attribute-value of the continuous type to a second data expression;

converting the class of each instance to the first data expression from a view point of each class, wherein the plurality of the instances is represented as plural groups by unit of class, and the number of the groups is equal to the number of the classes;

generating a linear function as a prediction formula of each class in which the attribute-value of the instance corresponds to a variable;

calculating a coefficient accompanying each variable in the linear function by assigning one of the first data expression and the second data expression of the instances by unit of the group to corresponding variables in the linear function whose class is the same as the group, wherein the linear function of each class is determined;

assigning the attribute-value of the new instance to a corresponding variable of the linear function of each class; and predicting the class of the new instance by comparing function values among all linear functions of all classes.

17. An inference method for generating a rule which is common to a plurality of instances of each class which are previously stored, wherein each instance includes a class and an attribute-value, a data type of the attribute-value is a discrete type of a continuous type, said method comprising steps of:

converting the attribute-value of the discrete type to a first data expression and the attribute-value of the continuous type to a second data expression, converting the class of each instance to the first data expression from a view point of each class, wherein the plurality of the instances is represented as plural groups by unit of class, the number of the groups is equal to the number of the classes;

generating a linear function as a prediction formula of each class in which the attribute-value of the instance corresponds to a variable;

calculating a coefficient accompanying each variable in the linear function by assigning one of the first data expression and the second data expression of the instances by unit of the group to corresponding variables in the linear function whose class is the same as the group, wherein the linear function of each class is determined;

determining coefficients of an orthogonal function by orthogonal expansion of each variable in the linear function of each class;

expressing each coefficient of the orthogonal function of each class as the first data expression; and calculating a logical proposition as the rule from the orthogonal function of each class including each coefficient of the first data expression, wherein the logical proposition is the rule of each class.

* * * * *

UNITED STATES PATENT AND TRADEMARK OFFICE
CERTIFICATE OF CORRECTION

PATENT NO. : 6,009,239
DATED : December 28, 1999
INVENTOR(S) : Chie MORITA et al.

It is certified that error appears in the above-identified patent and that said Letters Patent is hereby corrected as shown below:

Claim 1, col. 14, line 5, "instance" should read --instances--.

Claim 8, col. 14, line 66, "instance" should read --instances--.

Claim 14, col. 15, line 42, "lenear" should read --linear--.

Claim 16, col. 15, line 62, after "comprising", insert --steps of--.

Claim 17, col. 16, line 31, "type of" should read --type or--.

Signed and Sealed this

Fifth Day of December, 2000

Attest:

Q. TODD DICKINSON

Attesting Officer

Director of Patents and Trademarks